US008509776B2

(12) United States Patent
Adatrao et al.

(10) Patent No.: US 8,509,776 B2
(45) Date of Patent: Aug. 13, 2013

(54) NETWORK INITIATED PROACTIVE HANDOVER PROCEDURE FOR FAST MOVING WIRELESS DEVICES

(75) Inventors: Ravi M. Adatrao, West Dundee, IL (US); Tommy Chang, Niles, IL (US); Pramod Karnam, Rolling Meadows, IL (US); Apurv Mathur, Wheeling, IL (US); Robert S. Nikides, Carol Stream, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1085 days.

(21) Appl. No.: 11/960,106

(22) Filed: Dec. 19, 2007

(65) Prior Publication Data
US 2009/0163206 A1 Jun. 25, 2009

(51) Int. Cl.
*H04W 36/00* (2009.01)
(52) U.S. Cl.
USPC ..... 455/436; 455/434; 455/154.2; 455/160.1; 455/161.1; 370/328; 370/331
(58) Field of Classification Search
USPC ................ 455/436, 434, 154.2, 160.1, 161.1; 370/231, 235, 278, 328, 331
See application file for complete search history.

(56) References Cited

U.S. PATENT DOCUMENTS

| 5,175,867 A | * | 12/1992 | Wejke et al. | 455/439 |
| 5,787,348 A | * | 7/1998 | Willey et al. | 455/441 |
| 7,593,731 B2 | | 9/2009 | Lim et al. | |
| 7,953,412 B2 | | 5/2011 | Lee et al. | |
| 2004/0176094 A1 | | 9/2004 | Kim et al. | |
| 2005/0282547 A1 | | 12/2005 | Kim et al. | |
| 2007/0054667 A1 | | 3/2007 | Lee et al. | |
| 2009/0010226 A1 | | 1/2009 | Nishimura et al. | |

FOREIGN PATENT DOCUMENTS

| EP | 0406186 B1 | 9/1995 |
| JP | 2007027877 A | 2/2007 |
| WO | 0101720 A1 | 1/2001 |

OTHER PUBLICATIONS

Sunghyun, Cho et al.: "Hard Handoff Scheme Exploiting Uplink and Downlink Signals in IEEE 802.16e Systems", Vehicular Technology Conference 2006, VTC 2006-Spring, IEEE 63rd vol. 3, May 7-10, 2006, pp. 1236-1240.
Air Interface for Fixed and Mobile Broadband Wireless Access Systems—IEEE Std 802.16—2005—277 pages.
KIPO's Notice of Preliminary Rejection (English Translation), Aug. 2, 2011, all pages.

* cited by examiner

Primary Examiner — Nimesh Patel

(57) ABSTRACT

A method, information processing system, and wireless communication system, initiate a handover scanning procedure with a wireless device. The method includes monitoring a first signal strength measurement (606) transmitted by a wireless device (108). A second signal strength measurement associated with the wireless device (108) that is measured locally is monitored (606). The method also includes determining, in response to monitoring the first signal strength and the second signal strength measurement, if a scan event trigger has been detected (608). A scan initiation message is transmitted (614) to the wireless device (108) in response to a scan event trigger being detected. The scan initiation message signals the wireless device (108) to perform handover scanning procedures.

17 Claims, 6 Drawing Sheets

FIG. 2 —PRIOR ART—

NETWORK INITIATED PROACTIVE HANDOVER PROCEDURE FOR FAST MOVING WIRELESS DEVICES

FIELD OF THE INVENTION

The present invention generally relates to the field of wireless communications, and more particularly relates to handover procedures for wireless devices within a wireless communication network.

BACKGROUND OF THE INVENTION

Various wireless communication networks such as those utilizing IEEE 802.16 standards allow a wireless device to initiate scanning procedures for identifying cells. The wireless device identifies potential cells for initiating handover procedures therewith. One problem is that in current networks that allow wireless device initiated scanning, a device is required to wait until the Carrier-to-Interference-plus-Noise-Ratio ("CINR"), Received Signal Strength Indicator ("RSSI"), and Round Trip Delay ("RTD") are below corresponding SCAN threshold(s) to initiate a scan request to a base station. This is problematic because a wireless device that is fully mobile may no longer be in range with a base station for a handover to successfully occur. For example, an additional 20-50 frames may be required when performing bandwidth request ranging for sending a scan request to a base station. In many instances this time frame is too large for a fully mobile wireless device to sustain a call.

Therefore a need exists to overcome the problems with the prior art as discussed above.

SUMMARY OF THE INVENTION

Briefly, in accordance with the present invention, disclosed are a method, information processing system, and wireless communication system for initiating a handover scanning procedure on a wireless device. The method includes monitoring a first signal strength measurement transmitted by a wireless device. A second signal strength measurement associated with the wireless device that is measured locally is monitored. The method also includes determining, in response to monitoring the first signal strength and the second signal strength measurement, if a scan event trigger has been detected. A scan initiation message is transmitted to the wireless device in response to a scan event trigger being detected. The scan initiation message signals the wireless device to perform handover scanning procedures.

In another embodiment, an information processing system initiates a handover scanning procedure on a wireless device. The information processing system includes network adapter hardware and a processing unit that comprises a processor communicatively coupled to a memory. The processing unit is adapted to monitor a first signal strength measurement transmitted by a wireless device. A second signal strength measurement associated with the wireless device that is measured locally is monitored. The processing unit is also adapted to determine, in response to monitoring the first signal strength and the second signal strength measurement, if a scan event trigger has been detected. A scan initiation message is transmitted to the wireless device in response to a scan event trigger being detected. The scan initiation message signals the wireless device to perform handover scanning procedures.

In yet another embodiment, a wireless communication system is disclosed. The wireless communication system includes a plurality of base stations and a plurality of wireless devices. Each wireless device is communicatively coupled to at least one base station in the plurality of base stations. The wireless communication system also includes at least one information processing system that is communicatively coupled to at least one base station in the plurality of base stations. The information processing system includes network adapter hardware and a processing unit that comprises a processor communicatively coupled to a memory. The processing unit is adapted to monitor a first signal strength measurement transmitted by a wireless device. A second signal strength measurement associated with the wireless device that is measured locally is monitored. The processing unit is also adapted to determine, in response to monitoring the first signal strength and the second signal strength measurement, if a scan event trigger has been detected. A scan initiation message is transmitted to the wireless device in response to a scan event trigger being detected. The scan initiation message signals the wireless device to perform handover scanning procedures.

An advantage of the foregoing embodiments of the present invention is that a base station can initiate handover scanning procedures at a wireless device. The base station can send an unsolicited scan message to wireless devices which allows the devices to start scanning procedures without sending a scan request in response to detecting a weak signal. Another advantage of at least one embodiment of the present invention is that the pro-active scan initiation by the base station reduces overall handover latency. This may reduce call-drop rates for fully mobile wireless devices.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages, all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, and a residential gateway.

Wireless Communication System

Figure 1:
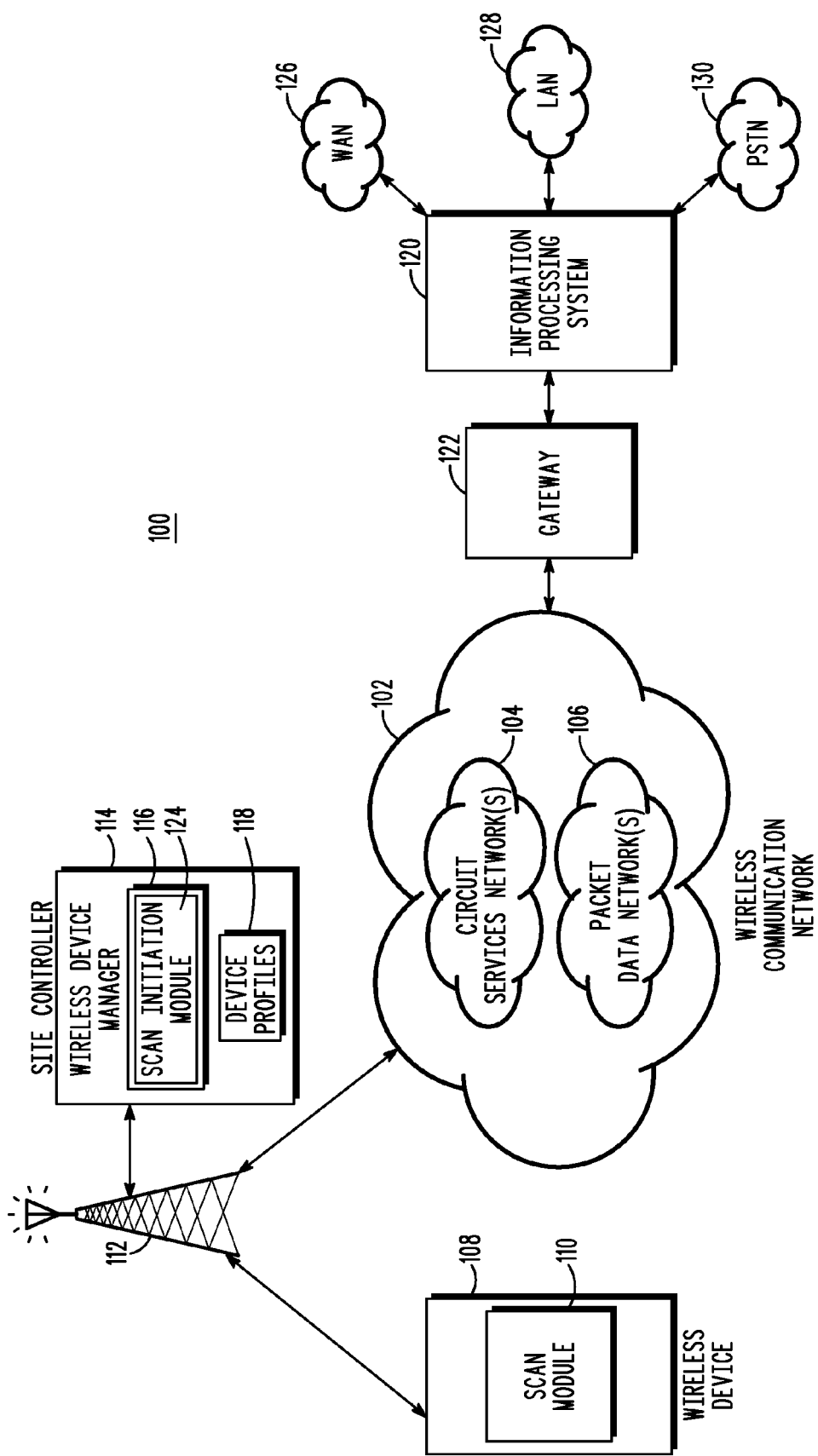
FIG. 1 is a block diagram illustrating a wireless communication system, according to one embodiment of the present invention.

According to one embodiment of the present invention FIG. 1 illustrate an example of a wireless communication system 100. FIG. 1 specifically shows a wireless communication network 102 comprising one or more access networks such as a circuit service network 104 and/or a packet data network 106. In one embodiment, the packet data network 106 is an IP or SIP based connectivity network, which provides data connections at much higher transfer rates then a traditional circuit services network. A packet data network 106 can comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like. A circuit services network 104 provides, among other things, voice services to the wireless device 102. It should be noted that access networks such as the circuit service network 104 and the a packet data network 106 also include additional components (not shown) such as controllers, transport/interconnect gear, network management modules, and other network components that should be known to those of ordinary skill in the art.

The one or more communications standards utilized by the networks 104, 106 may comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), IEEE 802.16 family of standards, Orthogonal Frequency Division Multiplexing ("OFDM"), Orthogonal Frequency Division Multiple Access ("OFDMA"), Wireless LAN ("WLAN"), WiMax or the like. Other applicable communications standards include those used for Public Safety Communication Networks including TErrestrial TRunked Radio ("TETRA"). Each access network 104, 106 can be owned and operated by separate wireless service providers. Alternatively, two or more of the networks 104, 106 can be owned and operated by the same wireless service provider.

The wireless communication system 100 supports any number of wireless devices 108 which can be single mode or multi-mode devices. Multi-mode devices are capable of communicating over multiple access networks with varying technologies. For example, a multi-mode device can communicate over the access networks 104, 106 using various services such as Push-To-Talk ("PTT"), Push-To-Talk Over Cellular ("PoC"), multimedia messaging, web browsing, VoIP, and multimedia streaming. In one embodiment, the wireless device 108 includes a scan module 110, which is discussed in greater detail below.

The wireless system 100 also includes one or more base stations 112 that are communicatively coupled to a site controller 114. Each site controller 114, in one embodiment, includes a wireless device manager 116 that comprises a scan initiation module 124, both which are discussed in greater detail below. Device profiles 118 are also included within the site controller 114. In one embodiment, the device profiles 118 can include AAA (Authentication, Authorization, and Accounting) information, mobility information, and other related information. In the context of WiMAX, the different mobility profiles can include, for example, Fixed/Nomadic (no Mobility support), Portable, Simple, Full (Mobility supported with different vehicular speeds ranging from 0-120 kph) The site controller 114 can retrieve device profiles 118 from a register (not shown) such as a Home Location Register, Home Subscriber Server, or the like. Mobility information can indicate, for example, that a wireless device is portable, has simple mobility, and has full mobility.

The wireless communication system 100 also includes one or more information processing systems 120 such as a central server communicatively coupled to the wireless communication network 102 via a gateway 122. The information processing system(s) 120 maintains and processes information for all wireless devices 108 communicating on the wireless network 102. Additionally, each information processing system 120 communicatively couples the wireless communications devices 108 to a wide area network 126, a local area network 128, and a public switched telephone network 130 through the wireless communication network 102. Each of these networks has the capability of sending data such as (but not limited to) a multimedia text message to the wireless devices 108.

In one embodiment, the wireless device manager 116 of the site controller 114 can initiate a scanning procedure at wireless device 108 via its scan initiation module 124. For example, the scan initiation module 124 can generate a scan message that is transmitted to wireless device 108. This scan message indicates to the wireless device 108 to initiate handover scanning procedures. The scan message can be transmitted to the wireless device 108 based on various events. In one embodiment, the wireless device manager 116 detects that a wireless device 108 has registered with the base station 112. After a given time interval, the scan initiation module 124 transmits a scan message to the wireless device 108. In this embodiment, the scan message is sent to the wireless device 108 so that it initiates handover scan procedures for determining if it is registered with the "best" base station. In other words scanning is initiated at the wireless device 108 to determine if another base station can provide better communication environment (e.g., more bandwidth, less interference, and/or other communication advantage) than the current base station.

In another embodiment, carrier to interference-noise ratio ("CINR") and received signal strength indicator ("RSSI") are used to determine when to send a scan message to the wireless device 108. In the IEEE 802.16 standard, a measurement is taken of a RSSI, which is the measured power of a received signal, and the carrier to interference-noise ratio CINR, which is the ratio of a desired signal power to noise power including both additive white Gaussian noise ("AWGN") and other undesired interference. These measurements are typically sent back to the base station 112 for air interference resource management.

The wireless device manager 116, in this embodiment, monitors the CINR sent by the wireless device 108 for the down-link and the RSSI/CINR on the up-link to determine when to pro-actively initiate the scanning by the wireless device (i.e., send the scan message). In one embodiment, the wireless device manager 116 monitors the CINR and RSSI information against one or more scanning thresholds. When a scan trigger event is detected, such as the CINR and RSSI values being less than or equal to a given threshold value, the scan initiation module 124 generates a scan message that is sent to the wireless device 108. The scan event triggers, in one embodiment, are based on measured channel conditions such as Carrier to Interference Noise Ratio, Receive Signal Strength Indication, and Round Trip Delay.

A few examples of scan event triggers are CINR based, Channel Sounding for TxAA, MIMO channel condition feedback, selected MCS. The wireless device scan module 110 receives the scan message from the wireless device 108 and performs handover scanning procedures. One example of how CINR and RSSI are used to initiate a scan is as follows. A base station uses the channel measurements reported by a wireless device for data scheduling purposes and also the device profile 118. These channel measurements can be either RSSI and/or CINR based measurements. A base station 112 can also initiate a scan in response to scan event triggers based off configuration parameters and one or more of the feedback metrics provided by the subscriber station or wireless device.

Different scanning thresholds can be associated with wireless devices 108 based on their mobility capabilities, which are identified in the respective device profiles 118. For example, a wireless device with a mobile capability defined as "portable" can be associated with a scanning threshold that is different than a threshold for a device with a mobility capability defined as "fully mobile". In one embodiment, the wireless device manager 116 transmits a scanning threshold to the wireless device 108 along with the scan message 108 that is based on the mobility capability of the device. In this embodiment, the wireless device 108, via its scan module 110, begins a handover scanning procedure based on the scan message and scan threshold received from the base station 112.

As can be seen from the above discussion, according to various embodiments of the present invention, a base station 112 can initiate handover scanning procedures at a wireless device 108. The base station 112 can send an unsolicited scan message to wireless devices 108, which allows the devices 108 to start scanning procedures without sending a scan request in response to detecting a weak signal. This is an advantage not available before the present invention. Another advantage of the various embodiments of the present invention is that the pro-active scan initiation by the base station 112 reduces overall handover latency. This reduces call-drop rates for full mobile wireless devices 108.

Figure 2:
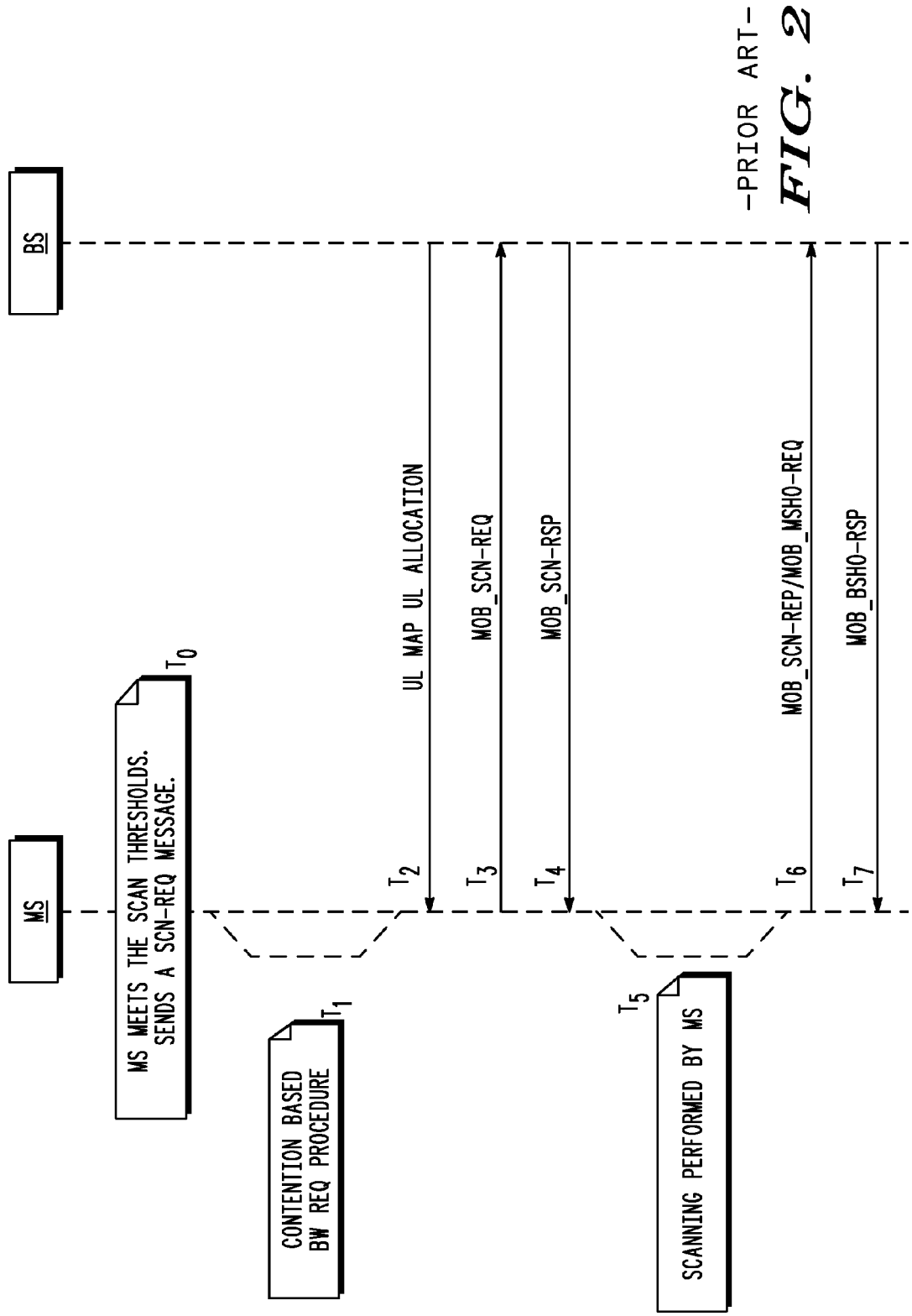
FIG. 2 is a transactional diagram illustrating a conventional handover scanning procedure initiated by a wireless device.

Timing Diagram Illustrating Conventional Scanning Initiated by a Wireless Device FIG. 2 is a timing diagram illustrating a conventional handover scanning procedure initiated by a wireless device. At time $T_0$ the wireless device determines that a scanning threshold has been met and sends a SCN-REQ message to the base station. At time $T_1$ a contention based bandwidth request procedure is performed between the wireless device and base station. Contention based bandwidth request procedure involves multiple subscribers contending for a single channel to request UL resources. This is a time consuming procedure as compared to dedicated Bandwidth allocation. The base station, at time $T_2$, transmits a UL (uplink) MAP UL allocation to the wireless device. The wireless device, at time $T_3$, responds by sending a MOB_SCN-REQ (scan request) to the base station. The base station receives the scan request from the wireless device and at time $T_4$ sends a MOB_SCN-RSP (scan initiation message) to the wireless device.

The wireless device, at time $T_5$, performs handover scanning. The wireless device, at $T_6$, a MOB_SCN-REP/MOB_MSHO-REQ. MOB_SCN-REP is the Mobile Scan Report that wireless device uses to provide channel measurements to the base station. In other words, the wireless device has detected a cell that it wants to handover to and sends a handover request to its current base station. The base station responds by sending a MOB_BSHO-RSP to the wireless device. The MOB_BSHO-RSP is a base station hand over response that indicates to the wireless device that it is allowed to handover to the requested cell.

This scanning procedure has many disadvantages. For example, in WiMax systems handover preparations latencies of 150 ms can exist for handover control messages. This can lead to an increase in dropped call rates by 40%-60%. Scanning can take up to 150 ms if a wireless device initiates the scanning. If a backhaul delay of 50 ms exists, the scanning latency increases call failure by 40%-60%. Conventional systems usually set scan thresholds latency to accommodate scanning initiated by the wireless device. This leads to compromises of QOS because the wireless device is constantly scanning.

Figure 3:
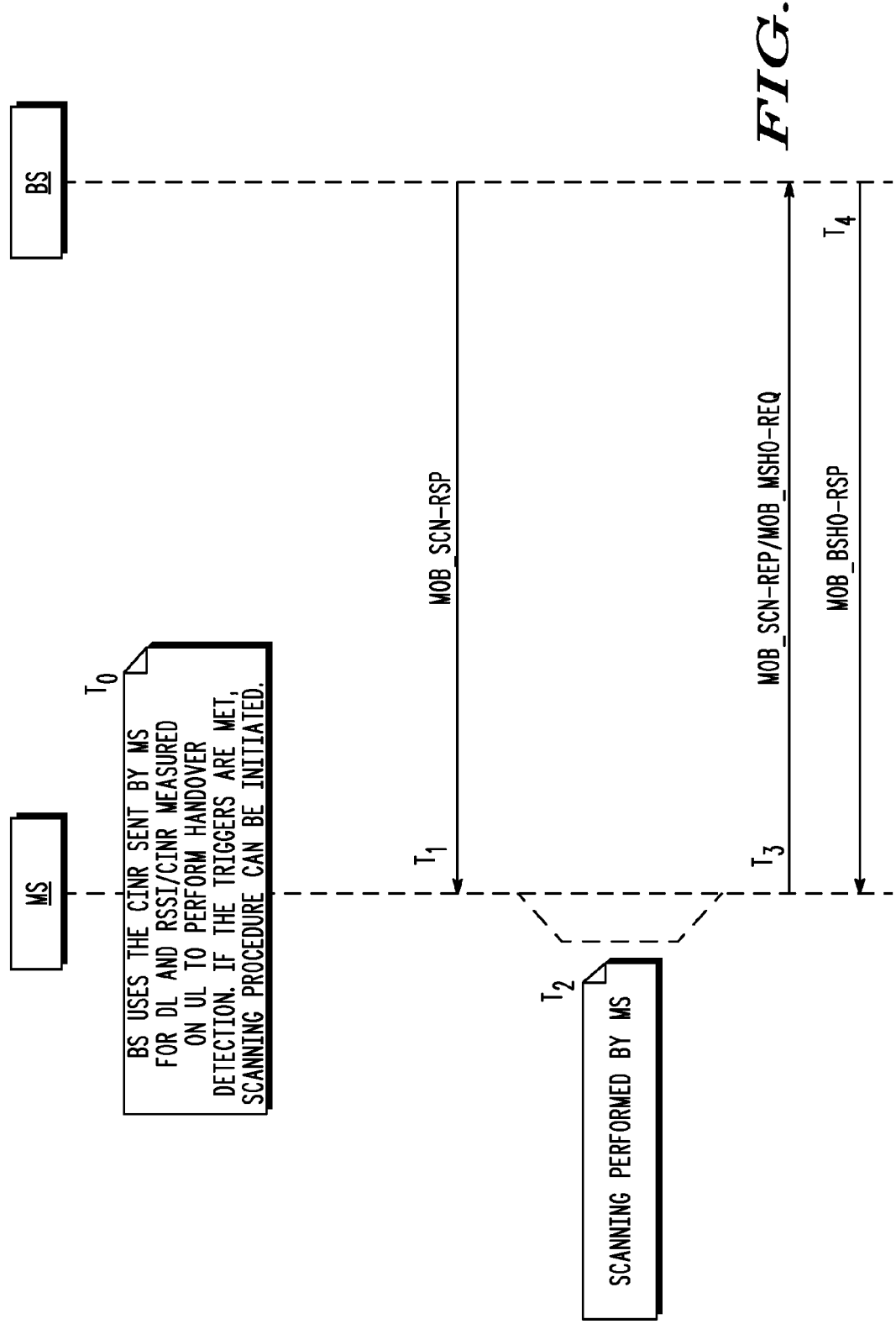
FIG. 3 is a transactional diagram illustrating a handover scanning procedure initiated by a base station on a wireless device, according to one embodiment of the present invention.

Timing Diagram Illustrating Pro-Active Scanning Initiated by a Base Station Device FIG. 3 is a timing diagram showing pro-active scanning being initiated at a wireless device 108 by a base station 112, according to one embodiment of the invention. At time $T_0$ the base station 112 analyzes the channel conditions received from a wireless device 108 for down-link and the channel conditions measured on the up-link to determine when to initiate scanning at the wireless device 108. If scan event triggers such as CINR based or Channel Sounding for TxAA are met, the wireless device manager 116 at the site controller 114 transmits a MOB_SCN-RSP (scan response message) to the wireless device 108 at time $T_1$.

The wireless device 108 receives the scan response message and subsequently performs a handover scanning procedure at time $T_2$. After completing the handover scanning procedure, the wireless device, at time $T_3$ transmits a MOB-SCN-REP/MOB_MSHO-REQ (a handover request) to its current base station 112. The base station 112, at time $T_4$, responds with a MOB_BSHO-RSP (base station handover response). The base station handover response, according to the present example, indicates to the wireless device 108 whether or not it is allowed to handover into the requested cell. As can be seen, a base station can initiate handover scanning procedures at a wireless device, which is an advantage of the embodiment of the present invention. The base station 112 can send an unsolicited scan message to wireless devices 108, which allows the wireless devices 108 to start scanning procedures without sending a scan request in response to detecting a weak signal. This pro-active scan initiation by the base station reduces overall handover latency and call-drop rates.

Wireless Device

Figure 4:
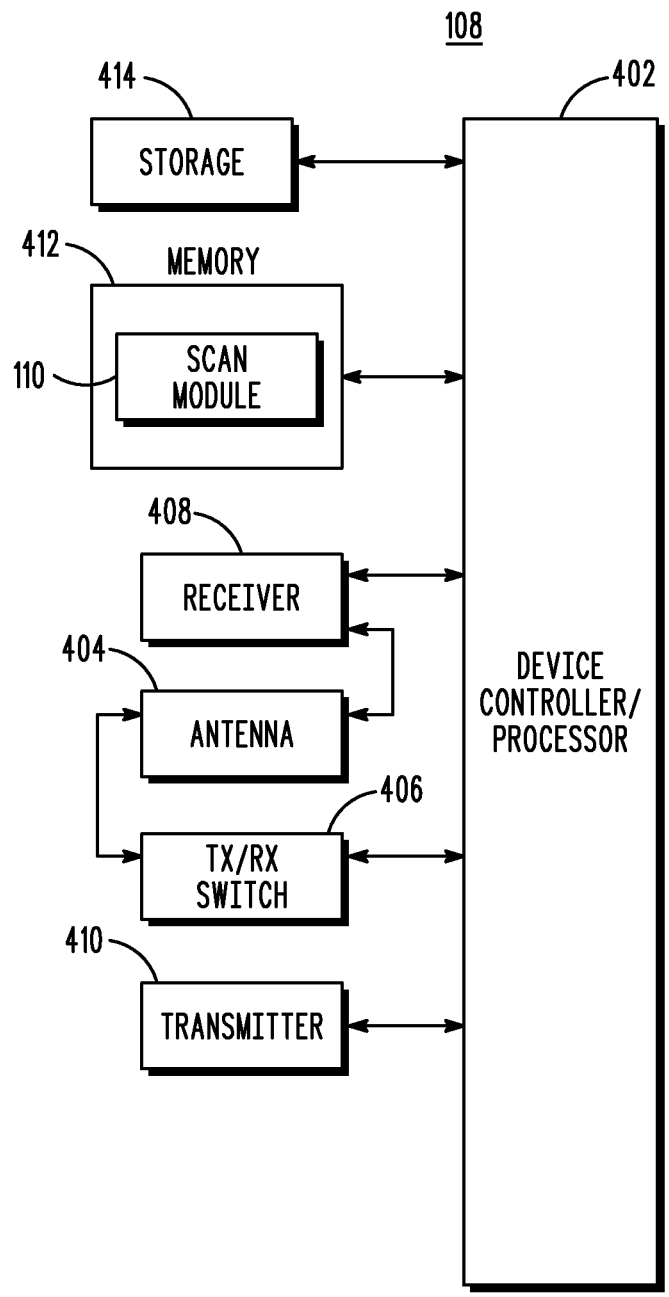
FIG. 4 is a block diagram illustrating a detailed view of a wireless device, according to one embodiment of the present invention.

FIG. 4 is a block diagram illustrating a detailed view of the wireless device 108 according to one embodiment of the present invention. It is assumed that the reader is familiar with wireless communication devices. To simplify the present description, only that portion of a wireless communication device that is relevant to the present invention is discussed. The wireless device 108 operates under the control of a device controller/processor 402, that controls the sending and receiving of wireless communication signals. In receive mode, the device controller 402 electrically couples an antenna 404 through a transmit/receive switch 406 to a receiver 408. The receiver 408 decodes the received signals and provides those decoded signals to the device controller 402.

In transmit mode, the device controller 402 electrically couples the antenna 404, through the transmit/receive switch 406, to a transmitter 410. It should be noted that in one embodiment, the receiver 408 and the transmitter 410 are a dual mode receiver and a dual mode transmitter for receiving/transmitting over various access networks providing different air interface types. In another embodiment a separate receiver and transmitter is used for each of type of air interface.

The device controller 402 operates the transmitter and receiver according to instructions stored in the memory 412. These instructions include, for example, a neighbor cell measurement-scheduling algorithm. The memory 412, in one embodiment, includes the scan module 110. The wireless device 108, also includes non-volatile storage memory 414 for storing, for example, an application waiting to be executed (not shown) on the wireless device 108.

Information Processing System

Figure 5:
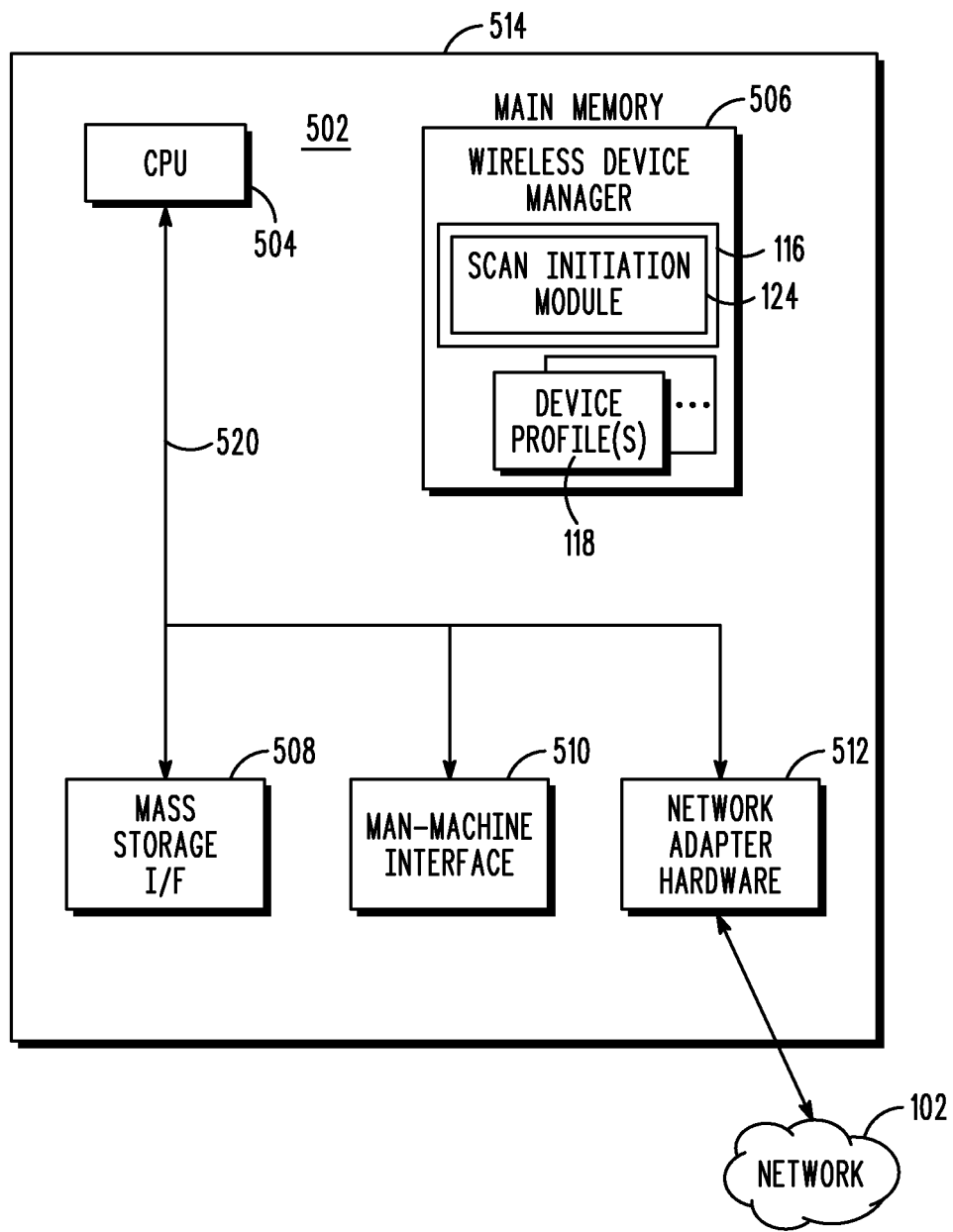
FIG. 5 is a block diagram illustrating a detailed view of a site controller, according to one embodiment of the present invention.

FIG. 5 is a block diagram illustrating a more detailed view of an information processing system 514 such as that comprised in the site controller 114. The information processing system 514 is based upon a suitably configured processing system adapted to implement the embodiment of the present invention. For example, a personal computer, workstation, or other such computer system, may be used. The information processing system 514 includes a computer 502. The computer 502 has a processor 504 that is connected to a main memory 506, a mass storage interface 508, a man-machine interface 510, and network adapter hardware 512. A system bus 520 interconnects these system components.

The main memory 506 includes at least the wireless device manager 116. The device manager 116, as discussed above, can include the scan initiation module 124. The memory 506 can also include device profiles 118 as discussed above. Although illustrated as concurrently resident in the main memory 506, it is clear that respective components of the main memory 506 are not required to be completely resident in the main memory 506 at all times or even at the same time. One or more of these components can be implemented as hardware.

Although only one CPU 504 is illustrated for computer 502, computer systems with multiple CPUs can be used equally effectively. Various embodiments of the present invention further incorporate interfaces that each includes separate, fully programmed microprocessors that are used to off-load processing from the CPU 504. Man-machine interface 510 allows technicians, administrators, and users, to directly connect to the information processing system 514.

The network adapter hardware 512 is used to provide an interface to the wireless communication network 102, a public network such as the Internet, and/or another network. Various embodiments of the present invention are able to be adapted to work with any data communications connections including present day analog and/or digital techniques or via a future networking mechanism. Although the embodiments of the present invention are described in the context of a fully functional computer system, those of ordinary skill in the art will appreciate that various embodiments are capable of being distributed as a program product via floppy disk, e.g., CD/DVD, or other form of recordable media, or via any type of electronic transmission mechanism.

Process of Initiating a Handover Scanning Procedure on a Wireless Device

Figure 6:
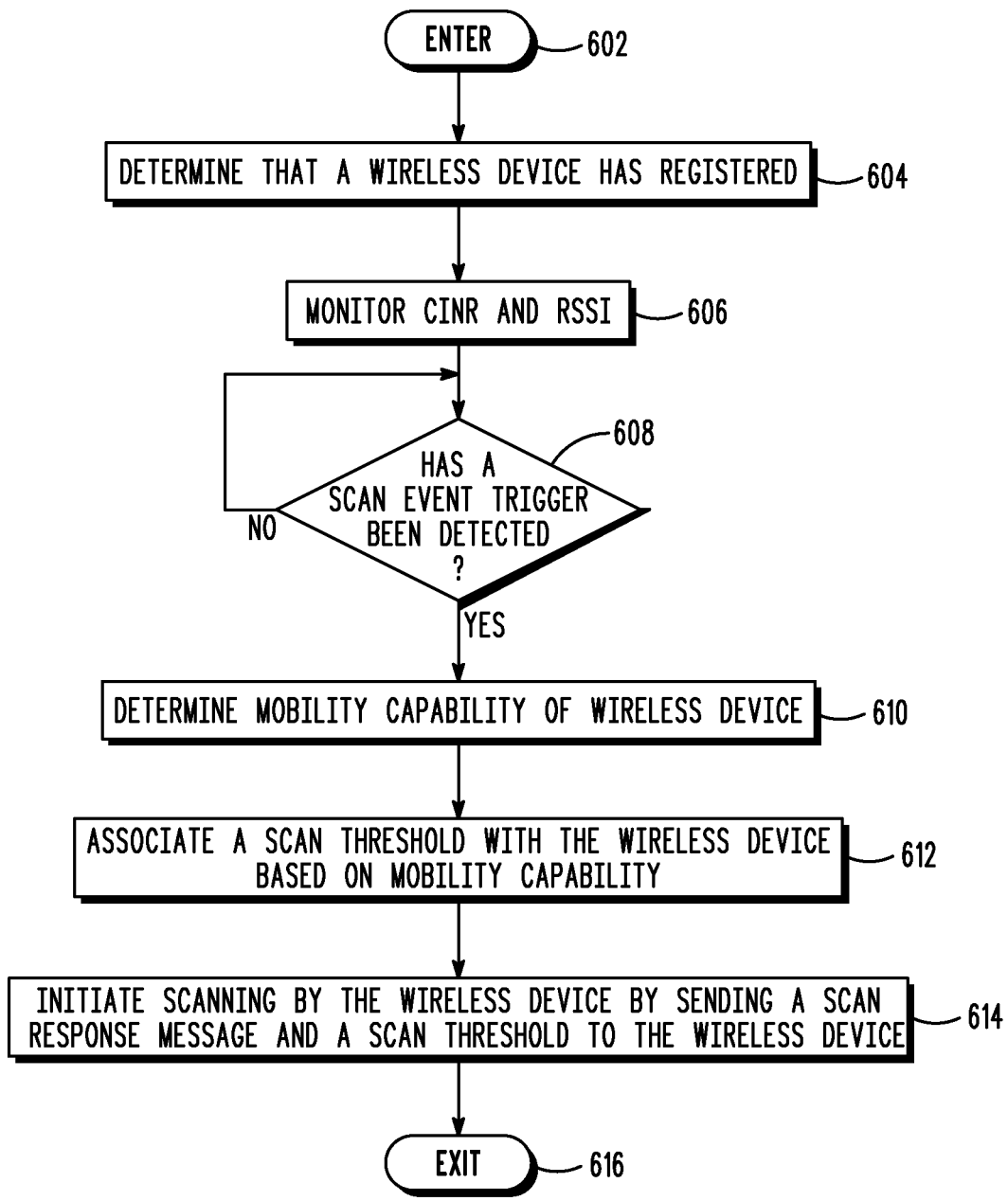
FIG. 6 is an operational flow diagram illustrating a process of a base station initiating a handover scanning procedure on a wireless device, according to one embodiment of the present invention.

FIG. 6 is an operational flow diagram illustrating a process of a base station initiating a handover scanning procedure on a wireless device 108. The operational flow diagram of FIG. 6 begins at step 602 and flows directly to step 604. The wireless device manager 116, at step 604, determines that a wireless device 108 has registered with the wireless network 102. The wireless device manager 116, at step 606, monitors the CINR information (first signal strength measurement) sent by the wireless device 108 and the RSSI/CINR information (second signal strength measurement) measured by the site controller 114.

The wireless device manager 116, at step 608, determines if a scan event trigger has been detected. For example, the wireless device manager 116 determines if the measured signal strength information is less than or equal to a given threshold value. In one example, it can determine if the first signal strength measurement sent by the wireless device 108 is less than or equal to the second signal strength measurement measured locally. If the result of this determination is negative, the wireless device manager 116 continues to monitor for scan event triggers. If the result of this determination is positive, the wireless device manager 116, at step 610, determines that a scan event trigger has been detected and accordingly determines the mobility capability of the wireless device 108. A scan threshold, at step 612, is associated with the wireless device 108 based on the determined mobility capability of the device. The site controller 114 via the base station 112, at step 614, sends a scan response message to the wireless device 108. The scan response message can include the scan threshold and scan event triggers the wireless device 108 to begin handover scanning procedures based on the threshold. The control flow then exits at step 616.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for initiating a handover scanning procedure on a wireless device, the method comprising:

monitoring, by a base station, a first signal strength measurement transmitted by a wireless device;

monitoring, by the base station, a second signal strength measurement associated with the wireless device that is measured locally at the base station;

determining, by the base station, in response to monitoring the first signal strength and the second signal strength measurement, if a scan event trigger has been detected, wherein the scan trigger event comprises comparing, by the base station, the first signal strength measurement and the second signal strength measurement;

determining a mobility capability of the wireless device;

associating a scan threshold with the wireless device in response to the mobility capability that has been determined; and transmitting, in response to a scan event trigger being detected, a scan initiation message and the scan threshold to the wireless device, wherein the scan initiation message signals the wireless device to perform handover scanning procedures, and further, wherein the scan threshold indicates to the wireless device to initiate handover scanning procedure when the scan threshold has been satisfied.

2. The method of claim 1, wherein the scan threshold indicates to the wireless device to begin handover scanning procedures when a signal strength measurement associated with its current connection to a base station is less than or equal to a given value.

3. The method of claim 1, wherein a mobility capability indicating greater mobility is associated with a scan threshold comprising a lower threshold than a mobility capability indicating less mobility.

4. The method of claim 1, wherein the first signal strength measurement is a Channel Condition measurement.

5. The method of claim 1, wherein the second signal strength measurement is at least equal to a Channel Condition measured locally.

6. The method of claim 1, wherein the first signal strength measurement is received from the wireless device on a down-link transmission path and the second signal strength measurement is measured locally based on an uplink transmission path.

7. An information processing system, communicatively coupled to a base station, capable of initiating a handover scanning procedure on a wireless device, the information processing system comprising:
   network adapter hardware;
   a processing unit, comprising a processor communicatively coupled to a memory, adapted to:
      monitor, by the information processing system, a first signal strength measurement transmitted by a wireless device;
      monitor, by the information processing system, a second signal strength measurement associated with the wireless device that is measured locally at the information processing system;
      determine, by the information processing system, in response to monitoring the first signal strength and the second signal strength measurement, if a scan event trigger has been detected, wherein the scan trigger event comprises comparing, by the information processing system, the first signal strength measurement and the second signal strength measurement;
      determine a mobility capability of the wireless device;
      associate a scan threshold with the wireless device in response to the mobility capability that has been determined; and
      transmit, in response to a scan event trigger being detected, a scan initiation message and the scan threshold to the wireless device via the network adapter hardware, wherein the scan initiation message signals the wireless device to perform handover scanning procedures, and further, wherein the scan threshold indicates to the wireless device to initiate handover scanning procedure when the scan threshold has been satisfied.

8. The information processing system of claim 7, wherein the scan threshold indicates to the wireless device to begin handover scanning procedures when a signal strength measurement associated with its current connection to a base station is less than or equal to a given value.

9. The information processing system of claim 7, wherein a mobility capability indicating greater mobility is associated with a scan threshold comprising a lower threshold than a mobility capability indicating less mobility.

10. The information processing system of claim 7, wherein the first signal strength measurement is a channel condition measurement.

11. The information processing system of claim 7, wherein in response to the first signal strength measurement being equal to or less than the second signal strength measurement measured locally, the wireless device manager determines that a scan event trigger has been detected.

12. The information processing system of claim 7, wherein the first signal strength measurement is received from the wireless device for a down-link transmission path and the second signal strength measurement is measured locally based on an up-link transmission path.

13. A wireless communication system, the wireless communication system comprising:
   a plurality of base stations;
   a plurality of wireless devices, wherein each wireless device is communicatively coupled to at least one base station in the plurality of base stations; and
   at least one information processing system communicatively coupled to at least one base station in the plurality of base stations, the information processing system comprising:
      network adapter hardware;
      a processing unit, comprising a processor communicatively coupled to a memory, is adapted to:
         monitor, by the information processing system, a first signal strength measurement transmitted by a wireless device;
         monitor, by the information processing system, a second signal strength measurement associated with the wireless device that is measured locally, at the information processing system;
         determine, by the information processing system, in response to monitoring the first signal strength and the second signal strength measurement, if a scan event trigger has been detected, wherein the scan trigger event comprises comparing, by the information processing system, the first signal strength measurement and the second signal strength measurement;
         determine a mobility capability of the wireless device;
         associate a scan threshold with the wireless device in response to the mobility capability that has been determined; and
         transmit, in response to scan event trigger being detected, a scan initiation message and the scan threshold to the wireless device, wherein the scan initiation message signals the wireless device to perform handover scanning procedures, and further, wherein the scan threshold indicates to the wireless device to initiate handover scanning procedure when the scan threshold has been satisfied.

14. The wireless communication system of claim 13, wherein the scan threshold indicates to the wireless device to begin handover scanning procedures when a signal strength measurement associated with its current connection to a base station is less than or equal to a given value.

15. The wireless communication system of claim 13, wherein a mobility capability indicating greater mobility is associated with a scan threshold comprising a lower threshold than a mobility capability indicating less mobility.

16. The wireless communication system of claim 13, wherein the first signal strength measurement is a channel condition measurement.

17. The wireless communication system of claim 13, wherein the first signal strength measurement is received from the wireless device for a down-link transmission path and the second signal strength measurement is measured locally based on an up-link transmission path.

\* \* \* \* \*